United States Patent [19]

Neefe

[11] 4,284,749
[45] Aug. 18, 1981

[54] CONTINUOUS WEAR HYDRATABLE, BOILABLE METHYLMETHACRYLATE COPOLYMER CONTACT LENS

[76] Inventor: Charles W. Neefe, P.O. Box 429, Big Spring, Tex. 79720

[21] Appl. No.: 59,972

[22] Filed: Jul. 23, 1979

[51] Int. Cl.$^3$ .......................... C08F 20/58; G02C 7/04
[52] U.S. Cl. .................................. 526/304; 526/312; 526/320; 351/160 H
[58] Field of Search ............... 526/303, 304, 312, 320; 351/160

[56] References Cited

U.S. PATENT DOCUMENTS

| | | |
|---|---|---|
| 3,803,093 | 4/1974 | Neefe ................................... 526/303 |
| 3,813,447 | 5/1974 | Tanaka et al. ........................ 526/304 |
| 3,983,083 | 9/1976 | Kaetsu et al. ......................... 526/304 |
| 3,984,485 | 10/1976 | Neefe .................................... 526/304 |
| 4,143,017 | 3/1979 | Tarumi et al. ........................ 526/320 |
| 4,163,608 | 8/1979 | Neefe .................................... 526/303 |

Primary Examiner—John Kight, III

[57] ABSTRACT

A gas permeable continuous wear contact lens material made by copolymerizing methylmethacrylate, N-(1,1-dimethyl-3-oxobutyl) acrylamide, propylene glycol monomethacrylate and methacrylic acid to form a hard solid contact lens material which may be made soft and hydrophilic by placing the lens in an alkaline solution and may be sterilized by boiling.

6 Claims, No Drawings

CONTINUOUS WEAR HYDRATABLE, BOILABLE METHYLMETHACRYLATE COPOLYMER CONTACT LENS

RELATED APPLICATIONS

U.S. Pat. No. 4,163,608 discloses a gas permeable contact lens composed of methylmethacrylate, N-(1,1-dimethyl-3-oxobutyl) acrylamide and methacrylic acid.

U.S. Pat. No. 3,803,093 discloses a material composed of methylmethacrylate, N-(1,1-dimethyl-3-oxobutyl) acrylamide and acrylic acid.

U.S. Pat. No. 3,900,250 discloses a semi-ridged gas permeable contact lens composed of cellulose acetate butyrate.

U.S. Pat. No. 3,984,485 discloses a material for contact lenses composed of methylmethacrylate, N-(1,1-dimethyl-3-oxobutyl) acrylamide and a cross-linking agent.

U.S. Pat. No. 3,710,796 filed May 1971 discloses a contact lens material made from ethylene glycol monomethacrylate also known as hydroxyethyl methacrylate copolymerized with diacetone acrylamide also known as N-(1,1-dimethyl-3-oxobutyl) acrylamide.

U.S. Pat. No. 3,965,063 filed June 30, 1975 discloses a contact lens material composed of hydroxyethyl methacrylate and N-(1,1-dimethyl-3-oxobutyl) acrylamide and cross-linking agents.

STATE OF THE ART

The present contact lenses are of two types: the soft hydrophilic and the hard hydrophobic. The soft hydrophilic lenses are currently made from cross-linked ethylene glycol monomethacrylate. The hard hydrophobic lenses are currently made from polymethylmethacrylate. The lenses made from hydrated methylmethacrylate as disclosed in U.S. Pat. Nos. 4,163,608 and 3,803,093 can not be sterilized by boiling due to the great increase in water content which occurs with boiling. Boiling increases the size and water content by up to 30% and increases the radius of curvature by the same amount. This expanded condition is slow in returning to the stable normal condition requiring up to 24 hours to equalibrate. Chemical sterilization, using thimersol and disodium edetate has been used with these materials by necessity. The hard lenses made from methylmethacrylate do not absorb these antimicrobia agents and therefore may be stored in and cleaned with solutions containing toxic preservatives such as benzalkonium chloride. Lenses made from methylmethacrylate are very hydrophobic and a wetting agent is required for the water to form a smooth layer on the surface of the lens. If not wetting solution is used, the water will form beads or droplets on the surface and prevent the lens from forming an image. The contact angle for methylmethacrylate is 60°; therefore, each droplet will contact the lens surface at an angle of 60°. A wetting agent will lower the wetting or contact angle to approximately 30° which is within range of acceptability.

Contact lenses that are being used at this time depend upon the flow of lachrymal fluids around the edge of the lens to supply the cornea with its necessary oxygen. The cornea tissue maintains a temperature much lower than the other body tissues. This is due to evaporation at the corneal surface and the lack of blood supply to the cornea. The temperature of the cornea must be at this lower level or its metabolic processes will be accelerated. The plastic now being used for fabricating contact lenses is a very poor conductor of heat. This insulating material covering a large percent of the corneal area raises its temperature which increases the chemical activity of the metabolic processes and the cornea demands more oxygen. The present lenses preclude the free exchange of atmospheric oxygen dissolved in the percorneal fluid from reaching the corneal tissue. The result is edema and eipthelium disorganization.

Lenses have been made with small holes drilled through the lens in an effort to overcome this problem. If the holes are large, they will be seen by the wearer and if small enough not to be seen, they become clogged with body secretions and are rendered useless.

The new and greatly improved contact lens of this invention overcomes these disadvantages by allowing dissolved gases to pass through the material from which the lens is made. The lens is an excellent conductor of heat as it contains water within the lens structure. This water content within the lens material produces a lens which will accept the lachrymal fluids at a very low angle of contact, resulting in a hydrophilic lens and elimination of the necessity of a wetting solution. Present plastics used for contact lenses, on the other hand, are hydrophobic and require a strong wetting agent to render then hydrophilic. Lachrymal fluids and dissolved gases can pass through the lens by diffusion.

The material is hard and rigid in the dehydrated state which allows it to be manufactured by the techniques and processes which have evolved over the past twenty years in the contact lens industry. Polishing is the same as polymethylmethacrylate except the polishing slurry may be acid.

The hydrated lens material at a thickness of 0.20 m/m will have an oxygen permeability of $DK = 14 \times 10^{-11}$ measured by the electropolographic method employed by Dr. Irving Fatt, University of California at Berkeley and an oxygen equivalent atmosphere, of 7.8% if measured by the rabbit cornea method of Dr. Richard Hill, Ohio State University. On Dr. Hills scale, an oxygen equivalent 5% is the minimum requirement to prevent detectable changes in the corneal epithelium. The herein disclosed material is therefore a candidate for a continuous wear contact lens. The addition of propylene glycol monomethacrylate or ethylene glycol monomethacrylate in small amounts to the methylmethacrylate, N-(1,1-dimethyl-3-oxobutyl) acrylamide, methacrylic acid copolymer produces a dramatic change in amount of water uptake when the lens is boiled and an even greater reduction in the time required to return to a useful size and curvature making boiling an effective and workable method of sterilization. The new continuous wear lens material may be sterilized by either chemical, as it does not heavly bind the toxic compounds to its surface, or by boiling as the material returns to useable lens parameters within two hours after cooling.

THE MATERIAL IS MADE AS FOLLOWS

The solid monomer N-(1,1-dimethyl-3-oxobutyl) acrylamide is dissolved in the liquid monomers methylmethacrylate, acrylic acid or methacrylate acid and propylene glycol monomethacrylate and polymerized using any of the standard processes used with methylmethacrylate and well known to the art. Catalysts such as azobis (2 methyl propionitrile), tertiary-butyl-peroctoate, or benzol peroxide may be used to achieve polymerization. The material may be cast in silicone molds to form contact lens blanks or cast in long rods which may be cut in to suitable discs from which contact lenses are made. Excellent results have been realized using a wide range of concentrations of N-(1,1-dimethyl-3-oxobutyl) acrylamide. Concentrations as low as 1% N-(1,1-dimethyl-3-oxobutyl) acrylamide and as high as 50% by weight have been used with excellent results. Methacrylic acid or acrylic acid in concentrations of 2% to 30% by weight have been used. Etylene glycol monomethacrylate or propylene glycol monomethacrylate have been used in concentration of 1% to 20% by weight. Cross-linking agents may be added in amounts of from 0.2% to 5.0% to increase strength and rigidity and lower the water content. Examples of cross-linking agents which may be used are ethylene dimetacrylate, allyl methacrylate, divinyl benzene, ethylene diacrylate, diethylene glycol diacrylate, and methallyl methacrylate. The finished lenses are treated with a base or alkaline solution such as sodium carbonate, sodium hydroxide 2%, ammonium hydroxide, or potassium hydroxide. This chemical treatment increases the water absorption of the lens material to make it hydrophilic. The lenses are then heated in normal saline to remove the sodium carbonate and bring the lenses to equilibrium. The material may be cross-linked after hydration to stabilize its water content.

A typical formulation is as follows. In a glass tube place 15 g. N-(1,1-dimethyl-3-oxobutyl) acrylamide, 100 g. methylmethacrylate, 15 g. methacrylic acid, 5 g. propylene glycol monomethacrylate, 2 g. of a cross-linking agent such as ethylene dimethacrylate, and 0.07 g. azobis (2 methyl propionitrile), purge of oxygen and place under a nitrogen blanket and heat to 40° C. for twelve hours and post cure at 70° C. for sixteen hours and cut into contact lens blanks. Lenses made from this material are found to be exceptionally strong and very durable in use.

The homopolymer of N-(1,1-dimethyl-3-oxobutyl) acrylamide is a clear slightly hydrophilic solid. The homopolymer of methylmethacrylate is a clear hard hydropobic solid. The homopolymers of acrylic acid and propylene glycol monomethacrylate are hydrophilic. The copolymer of N-(1,1-dimethyl-3-oxobutyl) acrylamide, methacrylic acid propylene glycol monomethacrylate, and methylmethacrylate is a clear hard solid which may be hydrated in sodium carbonate. Increasing the quantity of N-(1,1-dimethyl-3-oxobutyl) acrylamide will increase the oxygen permeability of the hydrated copolymer. The above example of a typical formulation provides an oxygen equivalent of 7.8% at a thickness of 0.15 millimeters. Higher oxygen levels may be obtained by increasing the amount of N-(1,1-dimethyl-3-oxobutyl) acrylamide.

Lenses currently made from the hydrogel ethylene glycol monomethacrylate are very soft elastic and flexible. The lens from the herein disclosed material is inherently a nonelastic flexible material which will not deform or wrinkle by eyelid action. It is well known that the hydrogel materials are very soft, pliable materials which will wrinkle and distort in response to eyelid pressure and thereby result in a distorted visual image. Furthermore, the copolymer material recited is ideally suitable for correcting astigmatism. The hydrogel materials will generally conform to the toric cornea and the torisity will be present on the front surface of the contact lens, and therefore, the astigmatism remains uncorrected. The material herein disclosed may be chemically sanitized by storage in a solution of sodium chloride 0.9%, thimersol 0.001%, disodium edetate (ethylenediaminetetraacetic acid) 0.1% or by heat such as boiling.

Various modifications can be made without departing from the spirit of this invention or the scope of the appended claims. The constats set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

That which is claimed:

1. A material for making flexable, nonelastic, oxygen permeable contact lenses having an oxygen equivalent of 7.8% at a thickness of 0.20 milimeter which may be sterilized by heat or chemicals, made of a copolymer comprising, 100 parts by weight methylmethacrylate monomer copolymerized with from 1 to 50 parts by weight of N-(1,1-dimethyl-3-oxobutyl) acrylamide monomer and 2 to 30 parts by weight methacrylic acid and 1 to 20 parts by weight propylene glycol monomethacrylate.

2. A lens material as in claim 1 wherein acrylic acid is substituted for methacrylic acid.

3. A lens material as in claim 1 wherein ethylene glycol monomethacrylate is substituted for propylene glycol monomethacrylate.

4. A lens material as in claim 1 wherein cross-linking agents are added to reduce the water absorption.

5. A lens material as in claim 1 which returns to its original size within two hours after being subjected to boiling temperatures.

6. A lens material as in claim 1 comprising of 15 g. N-(1,1-dimethyl-3-oxobutyl) acrylamide, 100 g. methylmethacrylate, 15 g. methacrylic acid, 5 g. propylene glycol monomethacrylate and 2 g. of a crosslinking agent.

* * * * *